INVENTOR.
HARVEY W. JANSSEN
BY
Bruce & Brosler
HIS ATTORNEYS

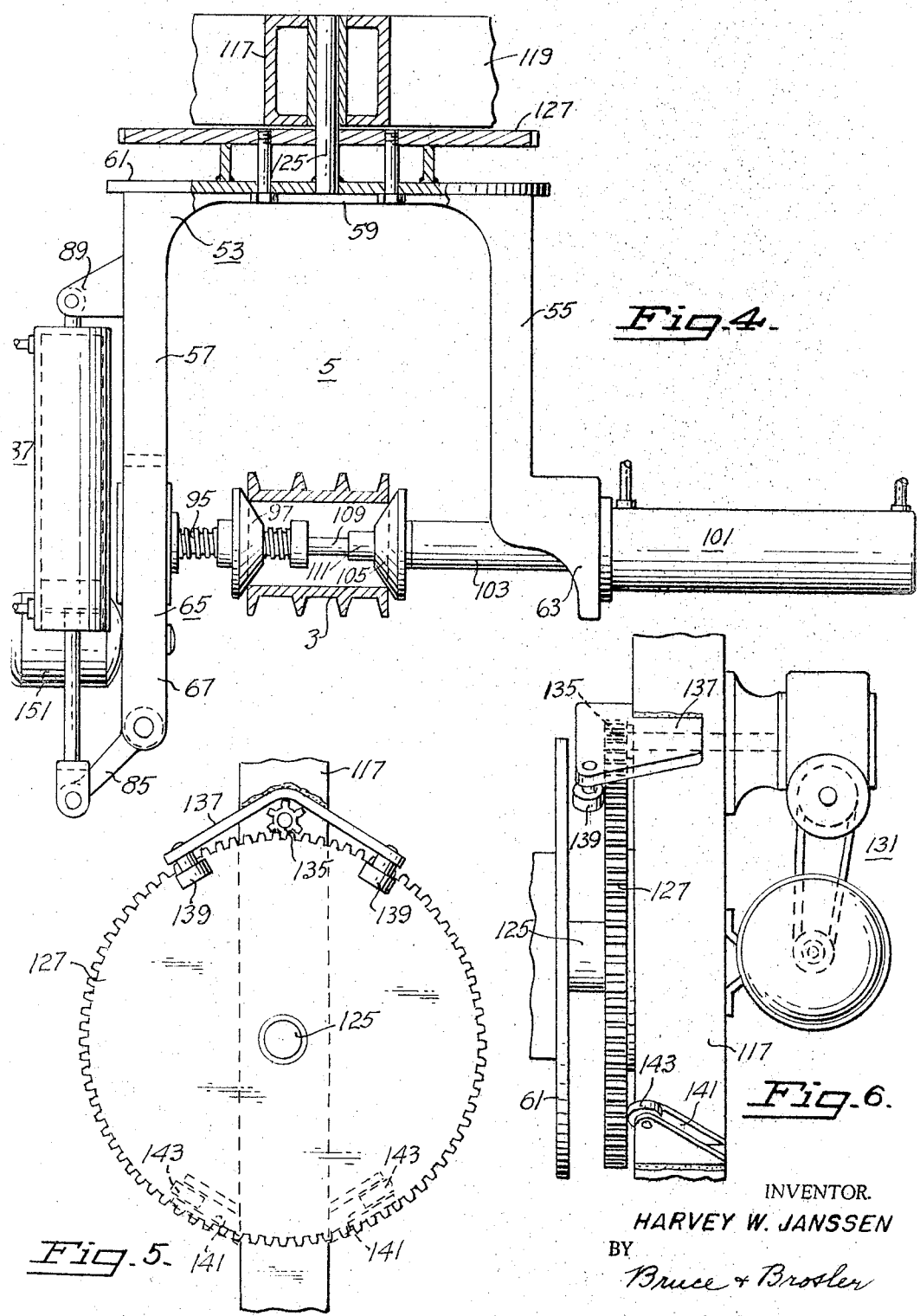

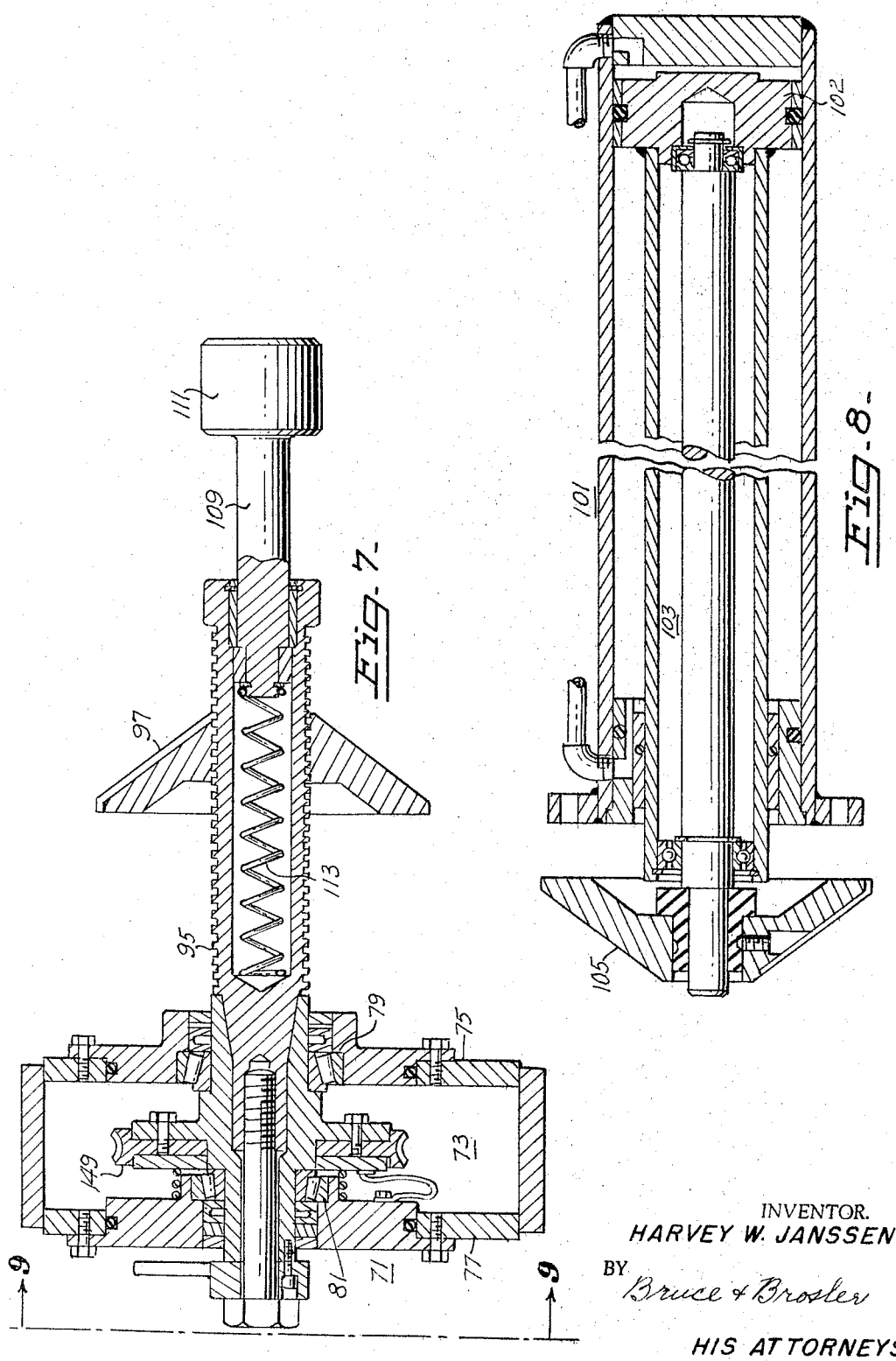

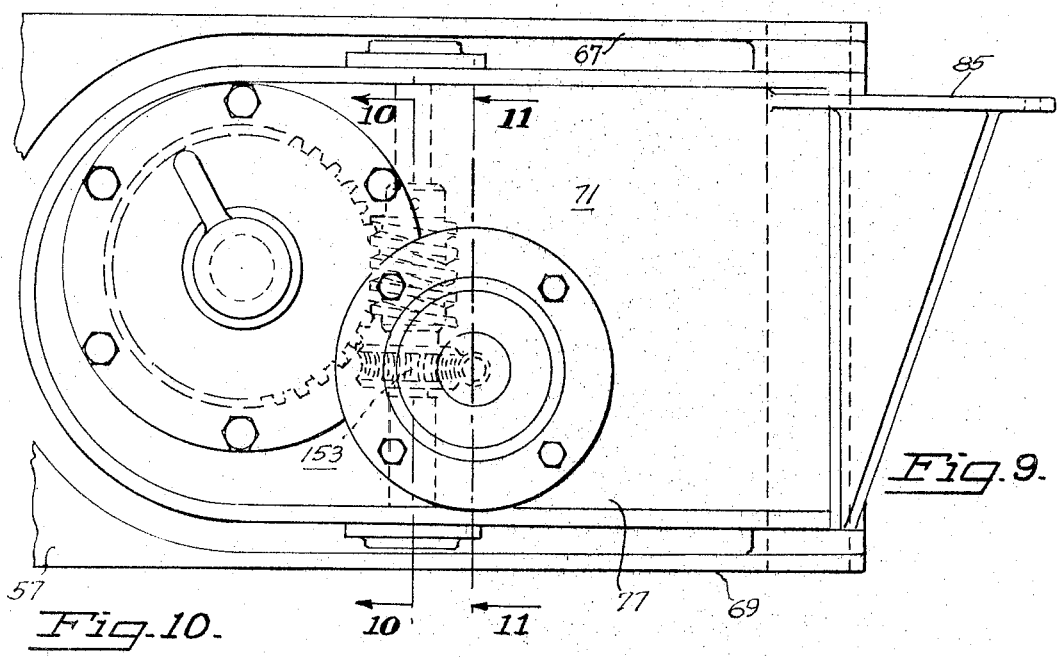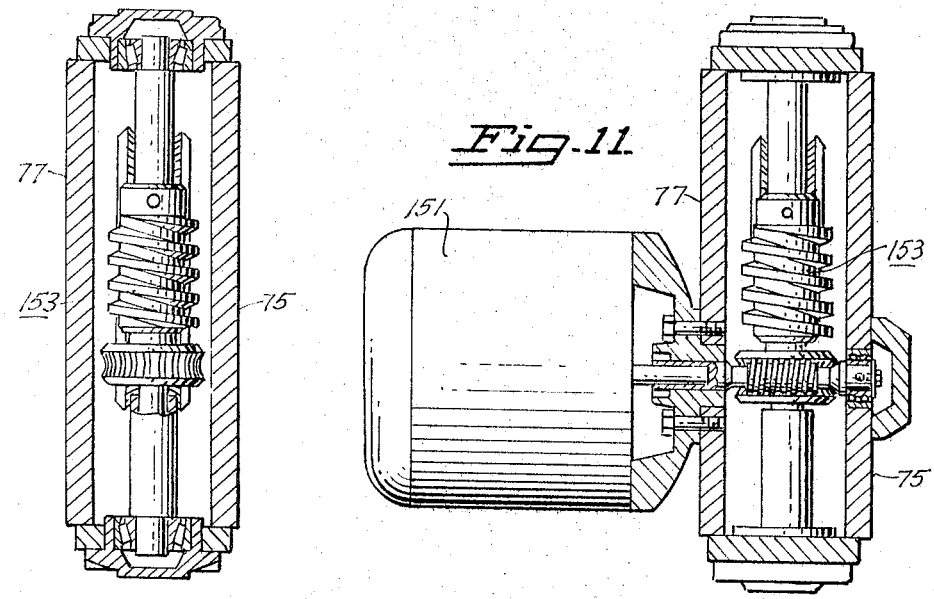

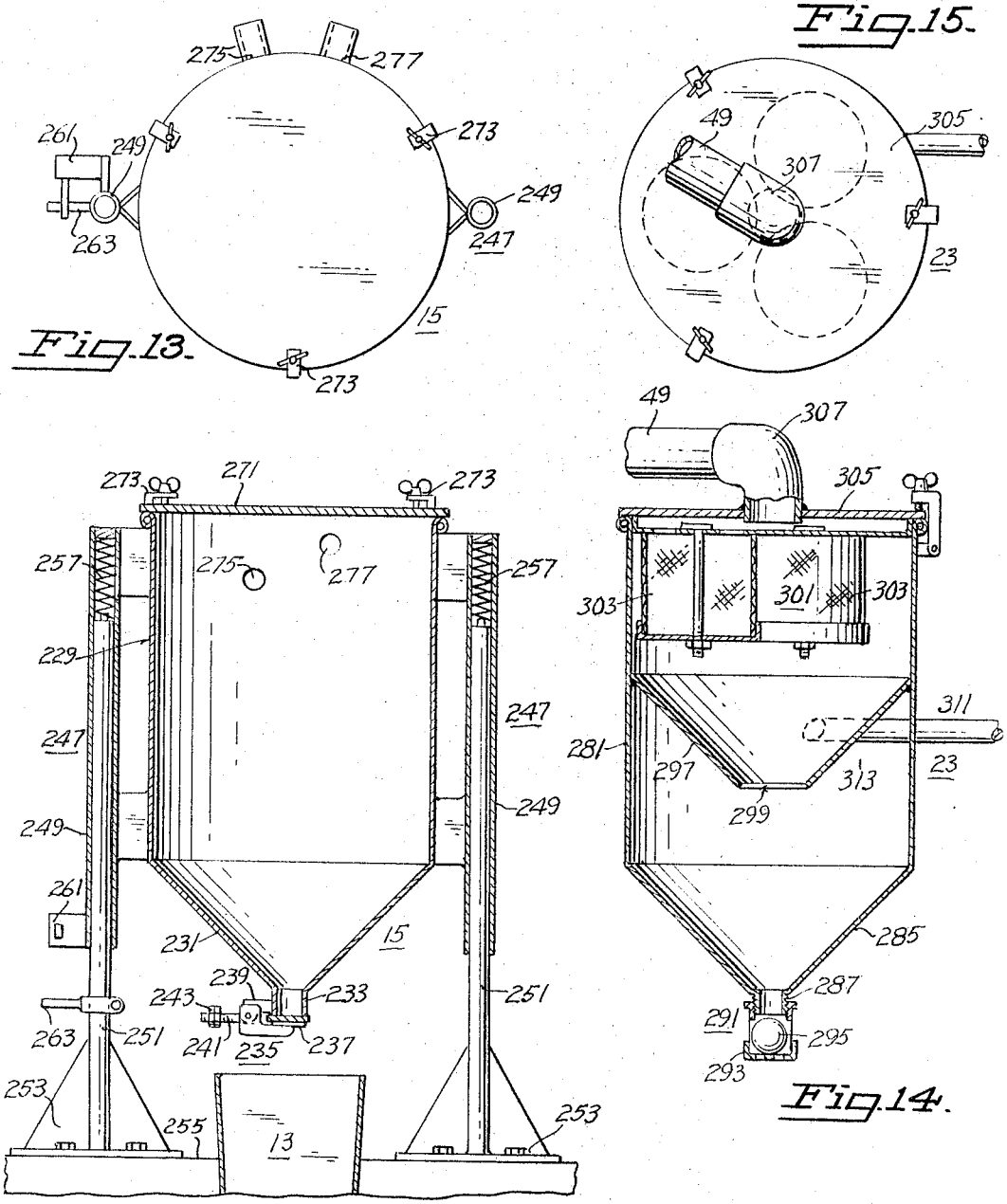

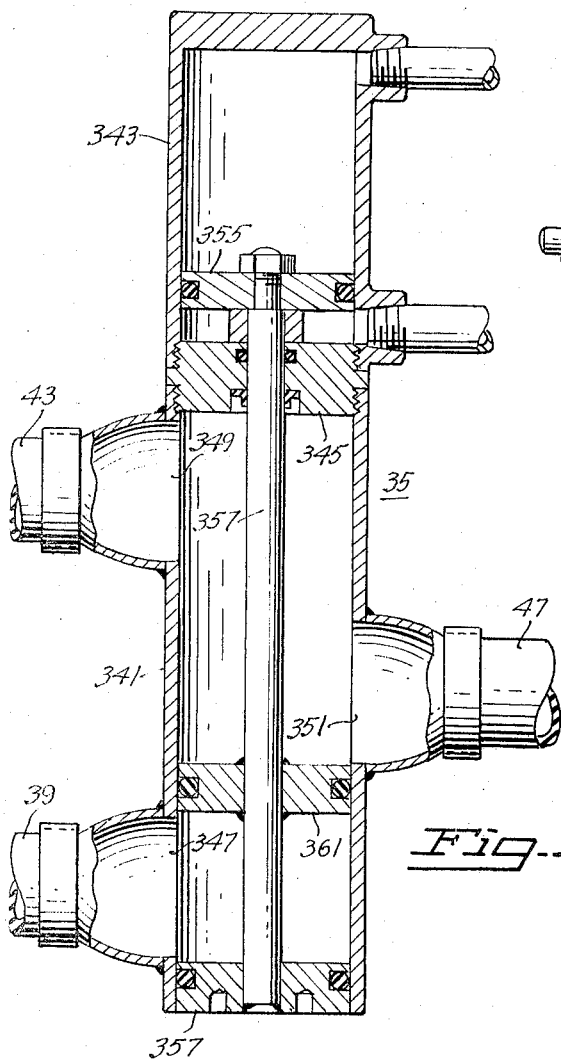
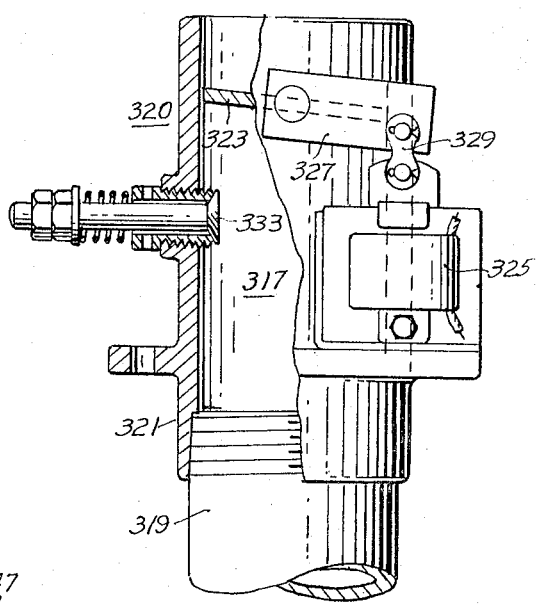

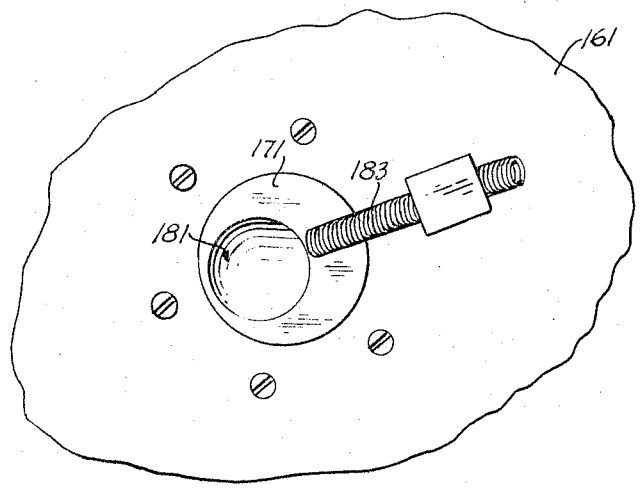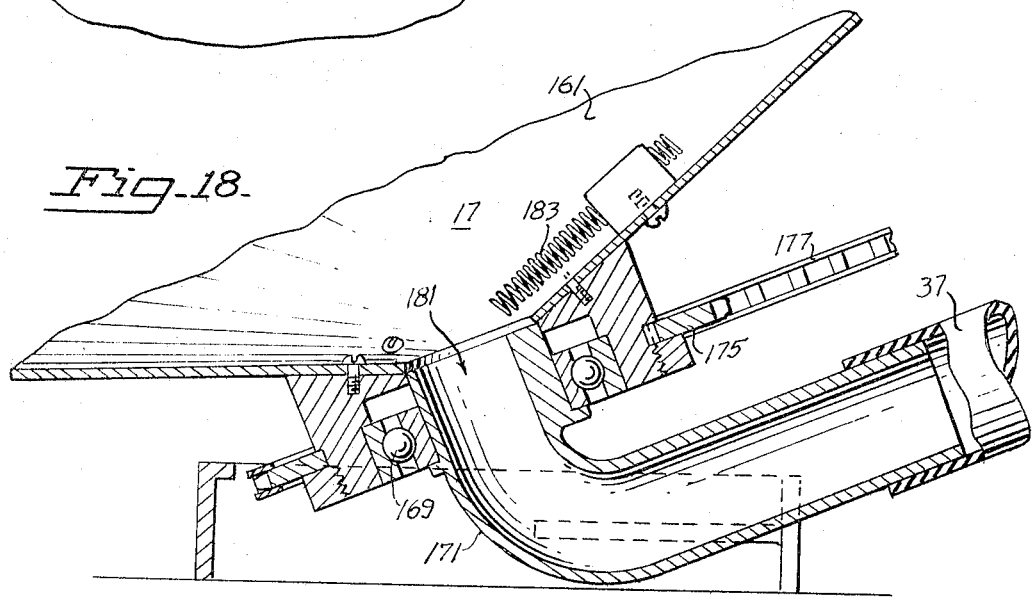

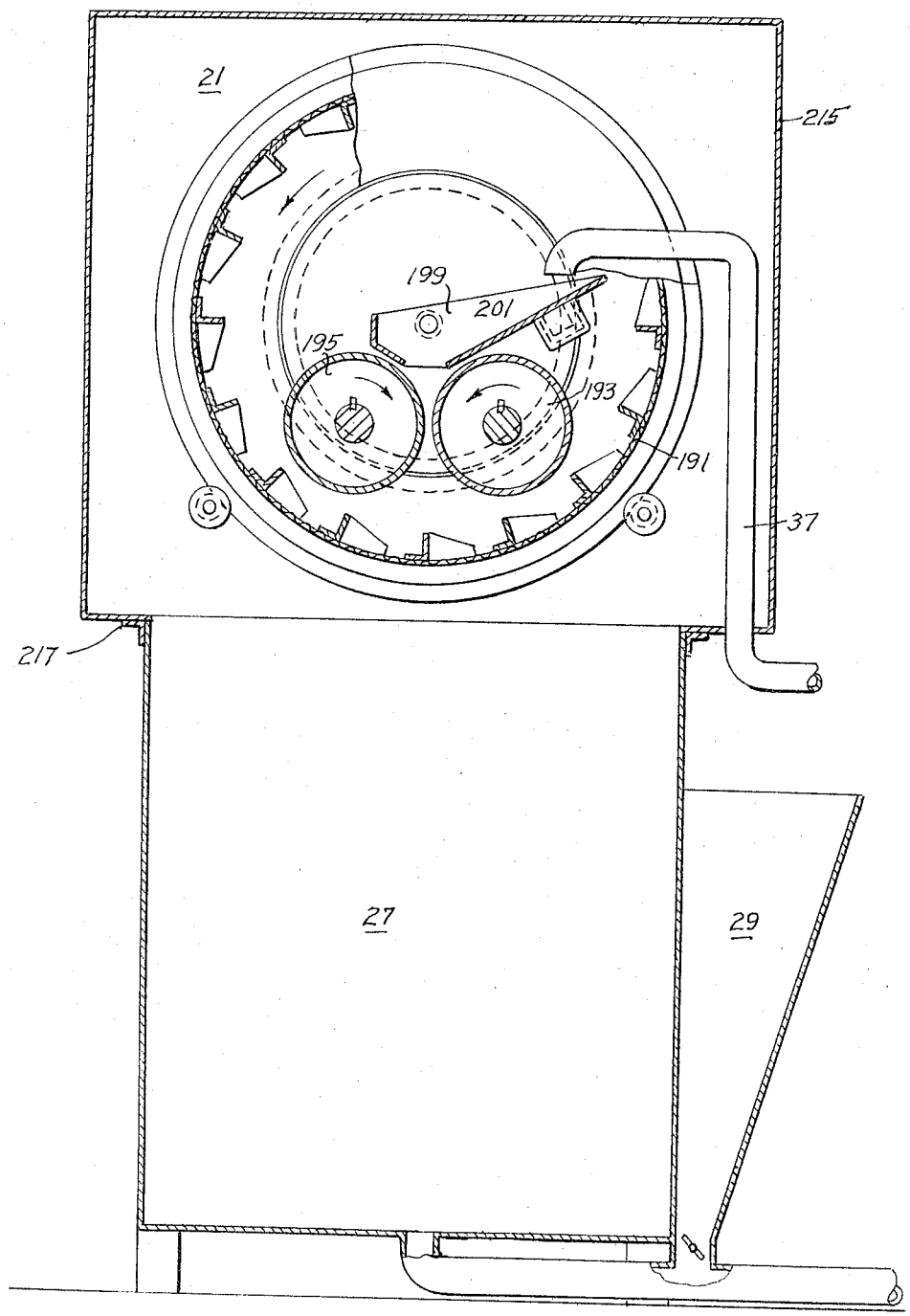

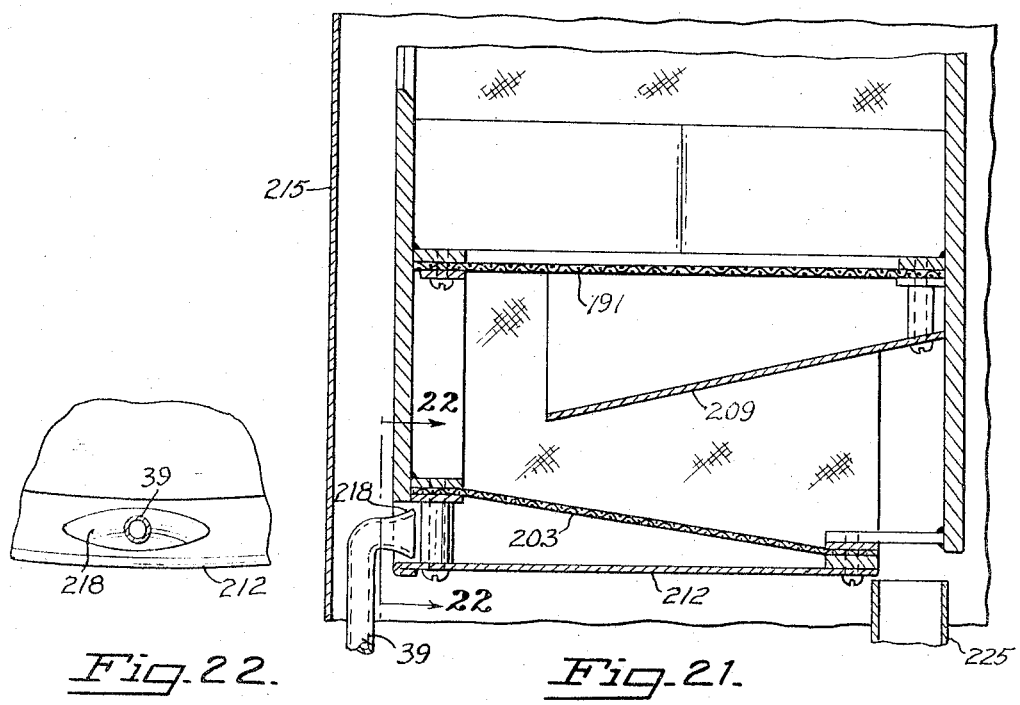

INVENTOR.
HARVEY W. JANSSEN
BY
Bruce & Brosler
HIS ATTORNEYS

United States Patent Office 3,305,663
Patented Feb. 21, 1967

3,305,663
WORK SUPPORTING MEANS IN WELDING
APPARATUS
Harvey W. Janssen, Lafayette, Calif., assignor to L & B
Welding Equipment, Inc., a corporation of California
Filed Jan. 30, 1964, Ser. No. 341,330
13 Claims. (Cl. 219—76)

My invention relates to welding equipment in general, and more particularly to a flux recovery system and included apparatus employed in the refacing of items of cylindrical form, such as rollers and idlers of a tractor or similar endless track machines.

Refacing of such cylindrical items is accomplished by submerged arc welding, requiring a continuous feed of granular flux to the arc through a hose or other guide means associated with each welding head employed, and movable therewith.

In prior art machines for performing such refacing operations, the settings and adjustments of both the welding heads and the work have to be disturbed after each operation, and then readjusted for the next operation. Such adjustments must be carefully made and accordingly rendered the overall refacing procedure slow and costly.

Also in view of the necessity for maintaining a continuous flow of granular flux during operating periods, such flux, if discarded following use, would render the operation quite uneconomical, and attempts in the past have, accordingly, been made to recover as much of this flux as possible for re-use. Such recovery procedures involved crushing and sifting operations, with the accompanying development of a considerable amount of abrasive dust, which, aside from the "dirt" resulting therefrom, created an atmosphere which might adversely affect the working parts of a machine, as well as constituting a health hazard.

Among the objects of my invention are:

(1) To provide a novel and improved flux recovery system for automatic and semi-automatic welding apparatus;

(2) To provide a novel and improved flux recovery system for automatic and semi-automatic welding apparatus, which system constitutes a circulating system free of dust;

(3) To provide a novel and improved machine employing one or more welding heads;

(4) To provide a novel and improved welding apparatus adapted for refacing of worn surfaces;

(5) To provide a novel and improved apparatus for refacing of cylindrical items such as roller and idlers, in which apparatus, such items may be installed and removed without disturbing the previous adjustments of the apparatus;

(6) To provide a novel and improved apparatus for refacing of cylindrical items, and associated flux recovery system.

Additional objects of my invention will be brought out in the following description of a preferred embodiment of the same, taken in conjunction with the accompanying drawings wherein:

FIGURE 4 is a fragmentary view in plan, depicting that assembly portion of the apparatus of FIGURE 1 for adjustably mounting the work;

FIGURE 5 is a front view in elevation of drive means for rotatably adjusting the work mounting assembly of FIGURE 4;

FIGURE 6 is a side view in elevation of the drive means of FIGURE 5;

FIGURE 7 is a view, for the most part, in section, through a portion of the work mounting assembly of FIGURE 4;

FIGURE 8 is a view in section through another portion of the work mounting assembly of FIGURE 4, which cooperates with that portion illustrated in FIGURE 7, to removably support the work;

FIGURE 9 is a view in the plane 9—9 of FIGURE 7;

FIGURE 10 is a view in section taken in the plane 10—10 of FIGURE 9;

FIGURE 11 is a view in section taken in the plane 11—11 of FIGURE 9;

FIGURE 12 is a view in section through a hopper assembly shown mounted at the top of the apparatus of FIGURE 1;

FIGURE 13 is a plan view looking down on the hopper assembly of FIGURE 12;

FIGURE 14 is a view in elevation of a dust filter and collector assembly constituting a component of the system of FIGURE 1;

FIGURE 15 is a plan view of the dust filter and collector assembly of FIGURE 14;

FIGURE 16 is a view in section through a two-stage switching valve assembly in the dust collecting portion of the system of FIGURE 1;

FIGURE 17 is a view in section through a valve assembly associated with the dust filter and dust collector assembly in the system of FIGURE 1;

FIGURE 18 is a fragmentary view in section of a used flux collector assembly included in the apparatus of FIGURES 1, 2 and 3;

FIGURE 19 is a fragmentary plan view depicting a feature of the used flux collector assembly of FIGURE 18;

FIGURE 20 is a view in elevation, for the most part in section, depicting a flux crusher and flux blending means, all included in the flux recovery system of FIGURE 1;

FIGURE 21 is a fragmentary view in section transversely of the flux crusher of FIGURE 20;

FIGURE 22 is a view taken in the plane 22—22 of FIGURE 21;

Figure 1:
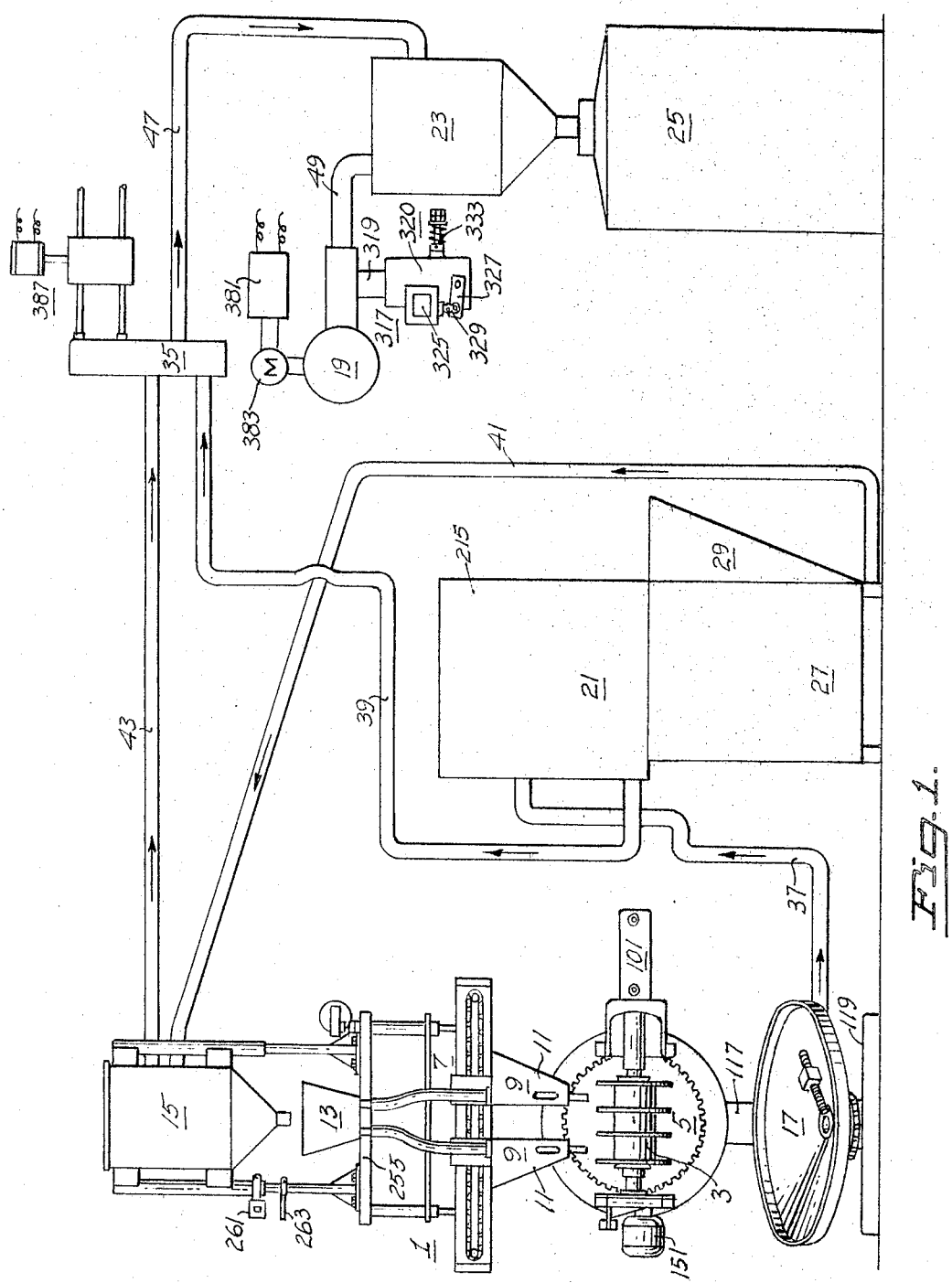
FIGURE 1 is a view depicting the flux recovery system of the present invention, with included apparatus for the refacing of cylindrical items such as rollers and idlers of an endless track machine.
Figure 2:
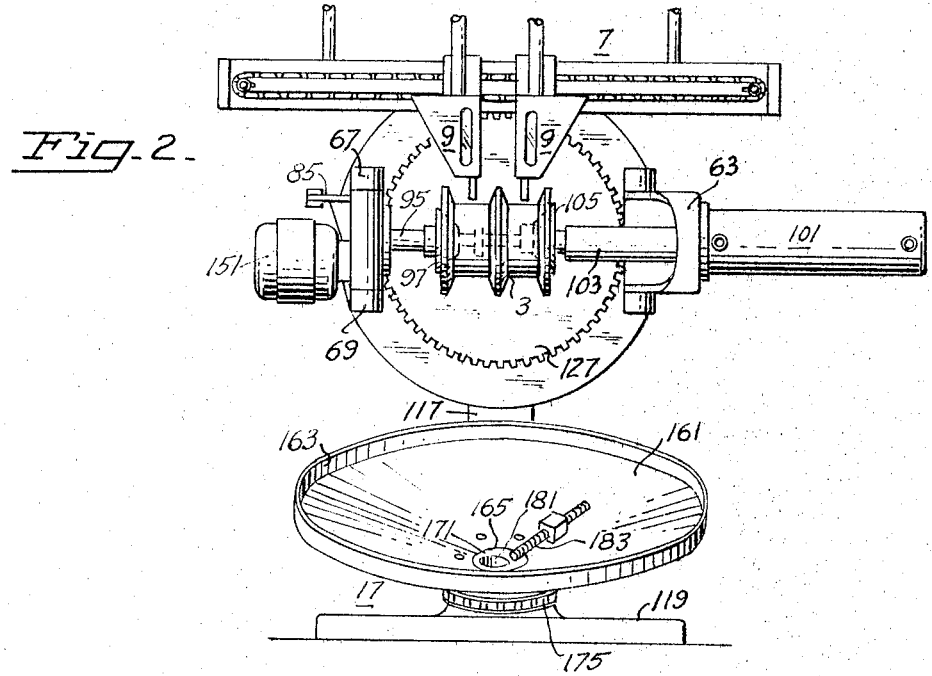
FIGURE 2 is a fragmentary front view in elevation of the welding apparatus of FIGURE 1.

Referring to the drawings for details of my invention in its preferred form, and more particularly FIGURE 1 of the drawings, the flux recovery system functions in cooperation with apparatus 1 utilizing welding flux in its operation, the specific apparatus depicted being one adapted for the refacing of rollers 3 and idlers (not depicted) such as constitute components of the tractor or similar endless track machine.

Such apparatus, in general, involves a work holder assembly 5 above which is a carriage mounting 7 for a pair of welding head assemblies 9 adapted for submerged arc welding by the inclusion, in each welding head assembly, of a flux hopper 11 fed from a common hopper 13 supported above the carriage mounting.

Above the common hopper 13 is a flux supply tank assembly 15 for supplying said apparatus with its flux requirements, while below the work supporting assembly 5 at the base of the apparatus, is provided collecting means 17 for the used flux, as it drops off or is peeled from the work during operation of the apparatus. Such used flux is in the form of slag made up of fused particles of flux mixed with metal from the welding wire.

Such used flux is vacuumed by any suitable vacuum pump 19, to a crusher assembly 21, wherein the used flux is crushed to proper particle size for re-use, and the metal fragments therein removed, the dust formed during the crushing operation, being vacuumed out of the crusher assembly and advanced to a dust filter and collector assembly 23 where it is collected and from which it is periodically emptied into a receptacle 25 for disposal to waste.

The crusher assembly is preferably mounted on a storage blending tank 27, into which the crushed flux is sifted, the supply of crushed flux being supplemented with new flux from a supply hopper 29 adjacent the blending and storage tank and having a flow connection to a common discharge for blending.

The blended flux constitutes a source of flux for filling the apparatus supply tank 15, such filling operation being accomplished by vacuum feeding of the flux to the supply tank and simultaneously withdrawing any dust accompanying such filling operation, utilizing the same vacuum pump 19 and dust filter and collector assembly 23. This is arranged for by a selective two-stage switch valve assembly 35 having an input opening to which is connected a vacuum line 37, 39 from the used flux collector 17 through the crusher assembly 21, and a second inlet opening to which is connected a vacuum line 41, 43 from the blending and storage tank 27 and hopper 29, through the supply tank 15, the valve assembly 35 having a discharge opening connecting to the filter assembly by a hose or pipe 47, and the filter assembly in turn, having an output connected to the vacuum pump 19 by a hose or pipe 49, which constitutes the suction line of the vacuum pump.

The entire flux recovery system is correlated to the operation of the apparatus utilizing such flux, and the circuits for correlating such operation will be discussed following a detailed description of the various apparatus components involved in the overall system.

The work holder assembly 5 for supporting work to be operated on in the apparatus 1 comprises a yoke 53 (FIG. 4) having substantially parallel spaced arms 55, 57 connected together at corresponding ends by a connecting bar 59 and cross-plate 61 which cross-plate is preferably circular in form. One of the yoke arms 55 terminates at its free end in a mounting 63 having an opening therethrough with its axis normal to the arm, while the other of the parallel arms 57 terminates in a fork 65 having spaced parallel prongs 67, 69.

Pivotally supported in the free ends of said prongs, is a spindle mounting means 71 (FIGS. 7 and 10) adapted for movement from a position in the plane of the associated yoke arm 57 to a position at substantially right angles thereto. Such spindle mounting means comprises a housing 73 having spaced walls 75, 77 carrying spindle supporting bearings 79, 81 respectively, on an axis normal to such walls.

Movement of the spindle mounting means 71 between its limiting positions, is controlled by a crank lever 85 connected at one end to the spindle mounting means, at the pivoting end thereof, and at its other end, to a two-way piston assembly 87 pivotally mounted at a fixed end to a bracket 89 on the associated yoke arm.

Rotatably supported in said bearings is a spindle 95 on which is adjustably mounted a cone 97 preferably by threadedly mounting the same on the spindle, whereby the cone may be adjusted as to position, longitudinally of the spindle.

Affixed to the mounting means 63 on the extremity of the first yoke arm 55, is a two-way piston assembly 101 having a piston 102 and an associated composite piston rod 103 facing the spindle 95 in axial alignment therewith, and rotatably carrying at its extremity, an opposing cone 105.

The aforementioned cones are adapted to enter the ends of a flanged roller 3 or the like, and between them, clamp such work and support the same for operating thereon. The adjustability of the one cone 97 on the spindle 95 adapts the work supporting means to work of different lengths.

Thus by driving the piston rod 103 forward, work may be clamped, and upon retracting such piston rod, the work may be unclamped for removal.

In addition to adjustably mounting a cone, the spindle 95 is provided with an extension 109 slidably carried thereby and terminating in a knob 111, the extension being normally urged toward its extended position by spring means 113 under compression between the spindle proper and the extension.

Figure 3:
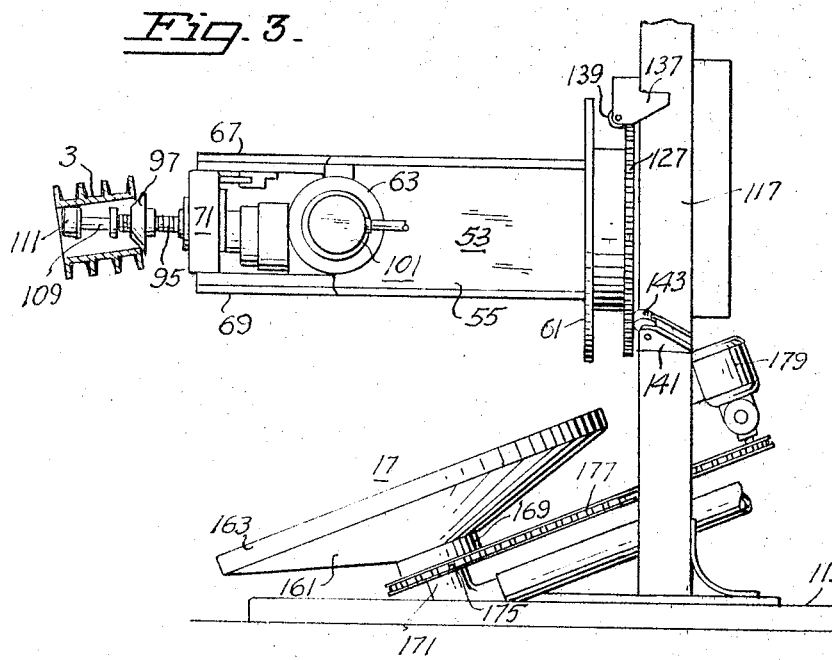
FIGURE 3 is a corresponding side view in elevation of the welding apparatus of FIGURE 1.

Thus in installing a piece of work to be operated on, it will be retained on the spindle in preparation for engagement by the clamping cone 105 which will drive the extension to a retracted position while raising the work onto the cones in preparation for operating thereon. Upon retractiton of the clamping cone, the spindle extension will simultaneously advance to receive that end of the work as it slides off and is freed from the clamping cone, to support the work in preparation for withdrawal of the same from the spindle. This function of the extension is depicted in FIGURE 3.

In the horizontal position of the work, the cylindrical surface of the roller may be exposed to one or more of the welding head assemblies 9, each including a welding head adapted for vertical adjustment on a carriage while in turn is adapted for horizontal movement on a carriage mounting means 7 in response to any type of drive means. The specific details of the mounting and drive of the welding heads is not a feature of the present invention, but may follow conventional practice or take the form illustrated and described in the patent to Turner G. Brashear, Jr., No. 3,110,279 of November 12, 1963, for Double Ended Work Positioner, wherein, in addition to the individual vertical adjustments of each welding head, the welding heads may be caused to move simultaneously in the same direction or in opposite directions.

To perform a refacing operation on the flanges of such rollers, the work holder assembly 5, is rotatably mounted about an axis through the center of the circular crossplate 61. The axis of the spindle 95 in its loading position, should then coincide with the axis of such rotation, which is accomplished by locating the spindle from the pivot axis of its supporting housing 71, a distance equal to the distance from said pivot axis to the axis of rotation of the work holder assembly.

The means for rotatably adjusting the work holder assembly includes a supporting structure in the form of a column 117 rising from a base 119, with a stub shaft extending from the center of the crossplate 61 through the supporting structure and journalled for rotation therein. A large gear 127 mounted on the stub shaft between the crossplate and the supporting structure and bolted or otherwise mechanically united to the crossplate, is driven by a motor drive assembly 131, carried by the supporting column and including a pinion 135 in mesh with said gear.

To counteract the gravity moment of the work holder assembly on its stub shaft, I provide a bracket 137 on the supporting column just above the gear and extending to the front thereof, where it is provided with rollers 139 in contact with the front face of the gear, to maintain the proper spacing between the gear at its upper end and its supporting structure.

At the lower region of the gear and behind the same, I provide additional bracket means 141 on the supporting column, such bracket means being provided with rollers 143 in contact with the rear face of the gear.

Thus, all strain due to the weight of the work holder assembly is taken off the stub shaft to prevent binding at this point and thereby permit free rotational adjustment of the work holder assembly.

With the work holder assembly described above, the work may be loaded into the machine and unloaded therefrom without striking any of the welding heads or otherwise interfering therewith, for in its unclamped condition, the work will always be supported below and out of reach of the welding heads. In this connectiton, it will be appreciated that in unloading work following an operation thereon, the act of withdrawing the clamping cone 105 will permit the work to slide down the surfaces of both cones and eventually slide from the clamping cone 105 at its proximate end to its rest position on the spindle, thus placing the work out of the way of the welding heads, following which, the spindle may be swung to its unloading position, to permit the finished work to be removed and a fresh piece of work installed. Upon clamping the work, it will automatically be raised to within arc length of the welding heads. Accordingly, no previous adjustments of the welding heads need be disturbed which means a considerable saving in time and labor.

In the operation of refacing the flanges of such rollers, the work holder assembly is adjustably rotated until the uppermost portion of each flange lies in a horizontal plane. When so positioned, no angular or rotational adjustments need be made in the welding head carriage mounting or drive.

When the nature of the operation on the work, is a refacing operation, rotation of the work simultaneously with horizontal travel of the welding heads is called for. The means for rotatably driving the work when clamped between the cones, includes a gear 149 on the spindle 95 within the housing 73, and a drive motor 151 mounted on the housing and drive connected to the gear 149 by a worm drive 153.

Below the work holder assembly is a used-flux collector means 17 previously mentioned. This takes the form of a shallow inverted collector cone 161 having a rim 163, and an opening 165 at its apex. This collector cone is rotatably supported at a tilt angle, and in position to catch used flux as it falls from the work, or is peeled therefrom, or otherwise discarded by the apparatus.

Affixed to the under side of the cone, concentric with the apex thereof, is a bearing assembly 169 adapted to fit about a nozzle 171, which is rigidly affixed, as by welding, to the frame members of the base of the apparatus. The nozzle 171 thus constitutes a stationary support about which the collector cone 161 may rotate.

The drive for such collector cone may involve a sprocket 175 mounted about the bearing assembly 169 and driveconnected by a drive chain 177 to a drive motor 179 mounted at a convenient place on the frame of the apparatus.

The nozzle, at its remote end, is coupled to that portion 37 of the vacuum line to the crusher assembly.

Of importance to the flux collector means 17, is the fact that the passageway 181 through the nozzle is eccentrically located with respect to the axis of the nozzle and the apex opening in the collector cone, and in conjunction with this, a resilient finger 183 is adjustably clamped to the upper side of the cone, in the vicinity of the apex opening, such finger being of sufficient length to just about reach the eccentrically located passageway 181 in the nozzle, when such passageway is at its furthest position with respect to such resilient finger. With such an arrangement, the resilient finger will be caused to intercept and pass across the entrance to the nozzle passageway during each rotation of the collector cone, whereby to dislodge any clinkers which are so large or are so shaped, as to block the entrance to the nozzle passageway.

As previously described, the used flux is vacuumed into the flux crusher assembly 21, where it is ground to usable particle size and the metal contaminent removed.

The flux crusher assembly may be one embodying the basic structural features of that crusher assembly illustrated and described in the patent to Forest A. Leader, No. 3,021,081 of February 13, 1962, for Flux Grinding Apparatus. Such apparatus includes a cylindrical screen 191, rotatably supported with its axis horizontally disposed, a pair of crushing rolls 193, 195 supported adjacent each other within the cylindrical screen and with their axis parallel and in a horizontal plane.

Used flux is deposited onto a guide chute or hopper 199 leading to the crushing rolls, a magnet 201 installed in the chute, serving to attract and remove metal fragments, as the used flux moves onto the rolls.

Surrounding the cylindrical screen 191 is a frustoconical screen 203 mounted for rotation with the cylindrical screen. This frusto-conical screen has a mesh substantially finer than that of the cylindrical screen, whereby to catch the siftings from the cylindrical screen and convey the same toward the larger or discharge edge, while dust may sift through and thus be separated from the re-usable flux.

A frusto-conical shield 209 of somewhat shorter axial length than the collecting screen 203, is mounted intermediate the cylindrical screen 191 and the collector screen 203, in a direction reverse to that of the collector screen, whereby the greater portion of the siftings through the cylindrical screen will be intercepted and guided to the upper or smaller end of the collector screen. Thus all siftings through the cylindrical screen will travel a long path down the collector screen to assure maximum removal of dust.

The flux grinding apparatus of the patent has, however, been modified somewhat to adapt it for the flux recovery system of the present invention, and toward this end, a shell 212 surrounding and enclosing the collector screen 203, is adapted to catch the dust sifting through, and the flux grinding apparatus is mounted on the blending tank 27 as previously described, and enclosed within a shroud 215 which rests on a sealing flange 217, provided on the blending tank, to create an enclosure in which a sub-atmospheric pressure may be developed by the vacuum pump 19 via that section 39 of the vacuum line, which enters the shroud at a point in the region of the dust accumulation whereby the dust may be withdrawn and conveyed to the filter assembly 23. For this purpose, the suction end of the line 39 terminates in a nozzle 218.

The discharge end of the frusto-conical collector screen 203 empties through a discharge pipe 225 into the blending tank, where the recovered flux, in entering the vacuum feed line 41 to the apparatus supply tank assembly 15, may mix with new flux discharging into such feed line from the new-flux hopper 29.

As previously indicated, such blended flux is fed through the vacuum line 41 to the apparatus supply tank assembly 15, the dust created therein by such feed of flux, being withdrawn through the portion 43 of the suction line for delivery to the filter assembly 23.

The apparatus supply tank assembly 15 comprises a tank 229 having an open upper end, and a hopper-shaped bottom 231 terminating in a discharge nozzle 233. Such nozzle is normally closed by a counterweighted valve assembly 235 which includes a flap valve 237 hingedly affixed to a bracket 239 on the surface of the nozzle, the valve being of a size adapted to span the nozzle opening. Extending from the flap valve to beyond the hinge axis of the hinge mounting is a threaded stem 241 on which a weight 243 is adjustably threaded, the weight being of a size more than sufficient, in any of its permissible adjustable positions, to maintain the flap valve in its closed position, in the absence of any weight or pressure on such valve from above.

The supply tank 229 is resiliently mounted on the apparatus, the resilient mounting means including a plurality of spring supports 247 about the tank, each support comprising a cylinder 249 vertically affixed to the side of tank, the cylinder being closed at its upper end and slidably installed over a rod 251 provided at its exposed end with a foot mounting bracket 253 for bolting or otherwise securing the rod in an upright position to a horizontal platform 255 at the upper end of the apparatus 1.

A spring 257 in each cylinder between the end of the rod and the closed end of the cylinder, serves to maintain a thrust in the direction of raising the tank to an upper position. Taken together, the springs are capable of supporting the tank assembly, when empty, in an elevated position, but are responsive to increasing weight, as when said tank is being filled with flux, to lower said tank to a lowermost or filled position, with the nozzle terminating within "mounds" reach of the flux hopper 13.

Adjustment of the valve weight 243 is such as to permit the flap valve 237 to open when this lowermost position is reached, whereupon the hopper 13 will fill and the flux pouring in will trap or block the valve in its open position, which can then be released for closing, only after emptying of the tank assembly and subsequent separation of the valve from the flux in the hopper, resulting from both the lowering of the flux level in the hopper and the raising of the flux tank by its supporting springs.

To determine the filled position of the flux supply tank 229, I provide means which is responsive to the supply tank reaching its filled position, for closing an electrical circuit, to be described, which circuit will function to terminate the filling operation. Such circuit closing means may take the form of a switch 261 mounted on one or the other of the spring separated elements, which, in the specific embodiment illustrated, is the cylinder 247, while in the path of movement thereof in the downward direction, is a trip arm or actuator means 263 mounted on the associated rod, at a location thereon, such as to actuate the switch when the supply tank reaches a position indicative of the tank having reached its filled condition.

A lag in the closing and opening of the switch, by reason, for example, of the throw of the actuating arm built into the switch, permits of restoring the supply tank to its upper position before the circuit will again be closed by the switch to start another filling cycle.

Inasmuch as the apparatus supply tank is connected in the vacuum line 41–43, it must be sealed to the atmosphere, and accordingly the tank is provided with a cover 271 adapted to be clamped into sealing engagement with the upper end of the tank, by suitable clamps of the thumb screw type, disposed at space points about the upper periphery of the tank.

For coupling the tank into the vacuum line, the tank is provided with an intake opening 275 through which to fill the same, and an outlet opening 277 for the withdrawal of dust from the tank, both of said openings being located in the upper region of the tank assembly, with the dust removal opening preferably being at a higher elevation.

The dust withdrawn from the supply tank 229 will flow along the vacuum line 43, 47 to the filter tank assembly 23 where, as previously mentioned, the dust will be separated from the air carrying the same and will be deposited periodically into the collector tank 25.

Referring to FIGURES 14 and 15 for details of the filter tank assembly, the same involves a filter tank 281 having a hopper-shaped bottom 285 terminating in a discharge nozzle 287, having associated therewith a normally open valve assembly 291, preferably in the form of a ball valve assembly.

Such ball valve assembly includes a ball cage 293 surrounding the discharge nozzle and affixed thereto, and a ball valve 295 in the cage adapted for movement between an upper position in which it closes the opening in the nozzle, and a lower position in which the discharge nozzle is uncovered. The ball valve is adapted to move to its closing position in response to reduction of pressure within the filter tank, and for this purpose, the ball is made of light weight material such as plastic.

Transversely of the filter tank, at approximately midway thereof, is an inverted frusto-conical baffle 297, the baffle having an opening 299 at the apex thereof.

Above the frusto-conical baffle are filter means 301 spanning the upper end of the tank, such filter means including a plurality of filter elements 303, while sealing the upper end of the tank, is a cover 305 to which a hose coupling 307 is affixed.

In the region of the baffle, the filter tank has an intake opening 311 for intake of dust laden air to be filtered. Associated with such opening is a directional nozzle 313 aimed tangentially of the baffle to produce a swirling or spiraling of the incoming dust laden air, to thus cause centrifugal separation of the heavier dust particles which are then free to separate out and fall to the hopper-shaped bottom of the tank for subsequent discharge. In this connection, such separation is assisted by a downward directional component of movement imparted to the air by the baffle.

Such air with its retained lighter dust component, is then free to escape upwardly through the apex opening in the baffle and pass through the filter elements, in the course of which, the lighter dust component carried by the air will be effectively filtered out.

In the absence of any precautionary measures, the efficiency of such filter elements will gradually become impaired to a greater and greater degree with increased accumulation of dust therein, until ultimately, the filter assembly would have to be disassembled for servicing the filter elements or replacing the same. Such procedure, of course, would necessitate periodic and prolonged shutdown of the system, including the refacing apparatus, which, of course, would necessarily impair the value of the entire system of the present invention.

To avoid such periodic prolonged shutdowns, the present invention contemplates the provision of means for automatically and periodically back flushing the filter elements to effect cleaning thereof. Towards this end, the present system includes means 317 for suddenly restoring atmospheric pressure to the filter assembly, by way of the filter elements, such means, not only effecting back flushing of the filter elements, but also resulting in restoration of the ball valve to its lower or open position, to thereby permit of the discharge of dust accumulation from within the filter assembly tank to the receiving tank 25 below.

The means for back flushing the filter elements comprises an air intake pipe 319 coupled into the suction line of the suction pump 19, such air intake pipe being normally closed by a butterfly valve assembly 320 including a valve housing 321, and a butterfly valve 323 therein adapted to be rotated from a normally closed position to open position by an associated solenoid 325. The solenoid is operatively coupled thereto by means of a yoke 327 straddling the housing and affixed to the ends of the pivot shaft of the butterfly valve, and a link 329 connecting the solenoid core to the yoke.

In the wall of the valve housing 321, at a point between the butterfly valve and the suction line, is a normally closed spring-biased safety valve 333 adapted to open in response to a reduction in pressure below a value deemed excessive under the circumstances.

To effectively back flush the filter elements in the manner described, necessitates the de-energizing of the vacuum pump 19, and such is taken care of in the operation of the electrical control circuits associated with the system, as will be subsequently described.

The switching valve assembly 35, which selectively couples to the filter assembly, either the apparatus tank assembly 15 or the flux crusher assembly 21, is depicted in detail in FIGURE 16 of the drawings to which reference will now be made. Such assembly includes a casing of two sections 341 and 343, threadedly coupled together through the intermediary of a partition plug 345.

The section 341 defines a valve housing in which are provided two intake openings one, 347, for connection of the vacuum line 39, and the other, 349, for connection of the vacuum line 43; and a common discharge opening 351 for connection of the common portion 47 of these vacuum lines.

The section 343 comprises a drive cylinder, housing a drive piston 355 having an associated piston rod 357 slidably passing through the plug 345 and slidably supported at its remote end in a plug 357 sealing the exposed end of the valve housing.

On the piston rod and affixed thereto for movement with the piston, is a disc type valve 361 slidably fitting the valve housing and adapted for movement from a position between one intake opening and the common outlet opening, to a position between the other intake opening and the common outlet opening.

Thus in one position, the common outlet opening will be in flow communication with that intake opening associated with the vacuum line 39 whereas in its other position, the common outlet opening will be in flow communication with the vacuum line 43. The operating position of the valve is determined by the position of the drive piston 355 in its cylinder, which in turn is controlled by a two-way hydraulic system connecting to the power cylinder at each end thereof.

Figure 23:
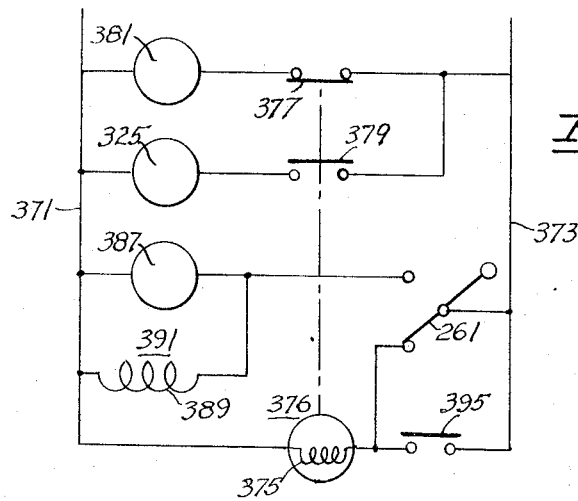
FIGURES 23, 24 and 25 represent three different stages of operation of a circuit associated with the apparatus of the preceding figures.
Figure 24:
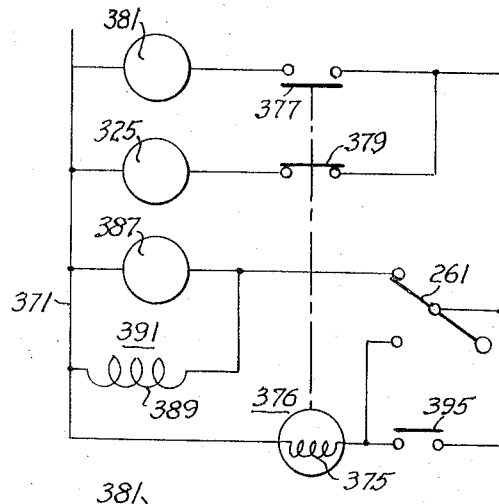
Figure 25:
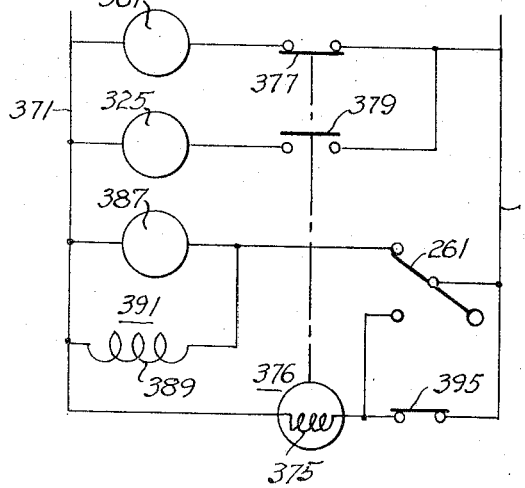

The sequence and proper timing of the various operating components of the flux recovery system are controlled electrically, the circuitry of which is depicted in three stages of operation in FIGURES 23, 24 and 25 of the drawings. The functioning of the system is controlled by the limit switch 261, which is of the single blade double throw type, the blade being adapted to be changed from the one contact with the supply tank in its upper or filling position, to its other contact, when the supply tank during filling, reaches its lowermost or filled position.

In the upper position of the apparatus supply tank assembly, the limit switch closes a circuit from one line wire 371 to the other line wire 373, through the coil 375 of a master relay 376. This relay has associated therewith a pair of normally open contacts 377 and a pair of normally closed contacts 379, which pairs of contacts, upon energization of the relay, will close and open respectively.

A master contactor 381 controlling the drive motor 383 for the vacuum pump 19, is connected from one power line wire to the other, through the normally open contacts 377 of the master relay 376 while the solenoid 325 controlling the butterfly valve, is connected from one power line wire to the other, through the normally closed contacts 379 of the master relay.

Thus, with the master relay energized as depicted in FIGURE 23, the vacuum pump 19 will be functioning, while the butterfly valve solenoid 325 will be de-energized, thus leaving the butterfly valve in its closed position.

Connectible between the power line wires by way of the other contact of the limit switch, the one which is adapted to be engaged when the supply tank reaches its lower position, are a vacuum valve solenoid 387, and the winding 389 of a thermal time delay relay 391 having a pair of normally open contacts 395 in a circuit shunting the prevailing closed contacts of the limit switch 261 when in its elevated position.

Under the conditions represented by the circuit of FIGURE 23, the switching valve assembly 35 connects the vacuum pump to the flux supply line which fills the supply tank with a blending of recovered flux and new flux. As the supply tank fills and gradually drops to its lower filled position, it causes a change in the condition of the limit switch, which in turn, brings about a circuit condition as disclosed in FIGURE 24.

It will be noted, that at this stage, the master relay 376 has become de-energized, thus disconnecting the contactor 381 from the power supply, and shutting down the vacuum pump 19. At the same time, the solenoid 325 associated with the butterfly valve, is connected to the power supply and becomes energized, thus opening the butterfly valve; and with the vacuum pump shut down, a sudden rush of air, in reverse, through the filter elements, results in back flushing of the elements.

The resulting restoration of atmosphere pressure within the filter tank after a matter of a few seconds, then permits the ball valve to drop to open position, thus enabling the dust accumulation in the filter tank to discharge into the collector receptacle below.

The vacuum valve solenoid, which, by reason of the change in the condition of the limit switch, is now energized, will function to reverse the hydraulic feed to the switching valve assembly and cause its valve to shift and disconnect the filter assembly from the supply tank and connect it to the flux crusher assembly. Nothing happens in the vacuum system however, at this point, inasmuch as the time delay relay delays for a few seconds, the closing of its normally open contacts, to allow for complete discharge of the dust accumulations from the filter tank. The subsequent closing of its contacts, results in energizing the motor contactor, which starts up the vacuum pump, and simultaneously de-energizes the solenoid which permits the butterfly valve to restore itself to its normally closed position.

The latter condition of the system is represented by the circuitry of FIGURE 25, and as thus set up, the previously filled supply tank will be feeding the common hopper for the welding head assemblies, with their flux requirements, while the used flux, collecting in the collector cone, will be drawn to the flux crusher assembly for processing, and the resulting dust withdrawn therefrom and carried to the filter assembly for collection.

When the supply tank has emptied itself, leaving sufficient in the common hopper to carry on during the next filling cycle, the supply tank will be elevated by its spring supports, thereby re-establishing the electrical circuit of that of FIGURE 23, to begin a new cycle of operation of the flux recovery system.

From the foregoing description of my invention in its preferred form, it will be apparent that the same fulfills all the objects attributed thereto, and while I have illustrated and described the same in its preferred form and in considerable detail, it will be apparent that the invention is subject to alteration and modification without departing from the underlying principles involved, and I accordingly, do not desire to be limited in my protection as may be necessitated by the appended claims.

I claim:

1. Apparatus for performing a refacing or welding operation on work comprising
 a welding head,
 a work holder assembly for supporting work beneath said welding head in position to be operated on, said work holder assembly comprising,
 a spindle for supporting work,
 means for mounting said spindle for swinging movement between a work position and a loading and unloading position,
 a cone positioned on said spindle,
 a second cone,
 means for mounting said second cone on a common axis with and facing said first cone when said spindle is in its work position, and adapted to move said second cone toward said first cone to clamp work to be operated on,
 and means for removably supporting work by said spindle and out of range of said welding head in response to withdrawal of said second cone.

2. Apparatus for performing a refacing or welding operation on work comprising
 a welding head,
 a work holder assembly for supporting work beneath said welding head in position to be operated on, said work holder assembly comprising,
 a yoke having substantially parallel spaced arms,
 a spindle for supporting work,
 means carried by one of said arms for mounting said spindle between said arms for swinging movement between a work position normal to said mounting arm, and a loading and unloading position at substantially right angles to said work position,
a cone adjustably positionable along said spindle and facing in the direction of said other arm, when said spindle is in its work position,
a second cone,
means carried by said other yoke arm for mounting said second cone on a common axis with and facing said first cone when said spindle is in its work position, and adapted to move said second cone toward said first cone to clamp work to be operated on,
and means for removably supporting work by said spindle and out of range of said welding head, in response to withdrawal of said second cone.

3. Apparatus for performing a refacing or welding operation on work comprising
a welding head,
a work holder assembly for supporting work beneath said welding head in position to be operated on, said work holder assembly comprising,
a yoke having substantially parallel spaced arms,
a spindle for supporting work,
means carried by one of said arms for mounting said spindle between said arms for swinging movement between a work position normal to said mounting arm, and a loading and unloading position at substantially right angles to said work position,
a cone adjustably positionable along said spindle and facing in the direction of said other arm, when said spindle is in its work position,
a second cone,
means carried by said other yoke arm for mounting said second cone on a common axis with and facing said first cone when said spindle is in its work position, and adapted to move said second cone toward said first cone to clamp work to be operated on,
and means included as part of said spindle for removably supporting work out of range of said welding head, in response to withdrawal of said second cone.

4. Apparatus for performing a refacing or welding operation on work, comprising
a welding head,
a work holder assembly for supporting work beneath said welding head in position to be operated on, said work holder assembly comprising,
a yoke having substantially parallel spaced arms,
a spindle for supporting work,
means carried by one of said arms for mounting said spindle between said arms for swinging movement between a work position normal to said mounting arm, and a loading and unloading position at substantially right angles to said work position,
a cone adjustably positionable along said spindle and facing in the direction of said other arm, when said spindle is in its work position,
a second cone,
means carried by said other yoke arm for mounting said second cone on a common axis with and facing said first cone when said spindle is in its work position, and adapted to move said second cone toward said first cone to clamp work to be operated on,
and means included as part of said spindle for removably supporting work out of range of said welding head, upon withdrawal of said second cone,
said last means comprising an outwardly spring biased extension on said spindle within the range of movement of said second cone.

5. Apparatus for performing a refacing or welding operation on work, comprising
a welding head,
a work holder assembly for supporting work to be operated on, comprising
a spindle for supporting work,
means for mounting said spindle for swinging movement between a work position under said welding head and a loading and unloading position displaced therefrom,
a cone positioned on said spindle,
a second cone,
and means for mounting said second cone on a common axis with and facing said first cone when said spindle is in its work position, and adapted to move said second cone toward said first cone to clamp work to be operated on.

6. A work holder assembly for supporting work to be operated on, comprising
a yoke having substantially parallel spaced arms,
a spindle for supporting work,
means carried by one of said arms for mounting said spindle between said arms for swinging movement between a work position normal to said mounting arm, and a loading and unloading position,
a cone positioned on said spindle and facing in the direction of said other arm, when said spindle is in its work position,
a second cone,
means carried by said other yoke arm for mounting said second cone on a common axis with and facing said first cone when said spindle is in its work position, and adapted to move said second cone toward said first cone to clamp work to be operated on,
and means for removably supporting work at a lower elevation by said spindle in the absence of said second cone.

7. A work holder assembly for supporting work to be operated on, comprising
a yoke having substantially parallel spaced arms,
a spindle for supporting work,
means carried by one of said arms for mounting said spindle between said arms for swinging movement between a work position normal to said mounting arm, and a loading and unloading position,
a cone positioned on said spindle and facing in the direction of said other arm, when said spindle is in its work position,
a second cone,
means carried by said other yoke arm for mounting said second cone on a common axis with and facing said first cone when said spindle is in its work position, and adapted to move said second cone toward said first cone to clamp work to be operated on,
and means included as part of said spindle for removably supporting work at a lower elevation in the absence of said second cone.

8. A work holder assembly for supporting work to be operated on, comprising
a yoke having substantially parallel spaced arms,
a spindle for supporting work,
means carried by one of said arms for mounting said spindle between said arms for swinging movement between a work position normal to said mounting arm, and a loading and unloading position at substantially right angles to said work position,
a cone adjustably positionable along said spindle and facing in the direction of said other arm, when said spindle is in its work position,
a second cone,
means carried by said other yoke arm for mounting said second cone on a common axis with and facing said first cone, when said spindle is in its work position, and adapted to move said second cone toward said first cone to clamp work to be operated on,
and means included as part of said spindle for removably supporting work at a lower elevation in response to withdrawal of said second cone.

9. A work holder assembly for supporting work to be operated on, comprising
a yoke having substantially parallel spaced arms, a spindle mounting means pivotally supported at the end of one of said arms, said spindle mounting means having a spindle mounting axis, means for swinging said spindle mounting means from a work operating position, with said spindle mounting axis normal to said one arm, to a loading and unloading position with said axis substantially parallel to said one arm, a spindle installed in said spindle mounting means, means for positioning and securing work on said spindle for operation thereon, said means including a cone adjustably positionable along said spindle, a cylinder mounted on the free end of said first arm, in alignment with said spindle, when said spindle mounting means occupies its work operating position, a piston in said cylinder having a piston rod directed toward said spindle on a common axis therewith, an oppositely facing cone carried by said piston rod, and means for driving said piston toward said spindle to clamp work between said cones, and for withdrawing said piston away from said spindle to release such work for removal from said spindle, and means for automatically retaining work on said spindle in condition for removal, upon such withdrawal of said piston.

10. A work holder assembly for supporting work to be operated on, comprising a yoke having substantially parallel spaced arms, a spindle mounting means pivotally supported at the end of one of said arms, said spindle mounting means having a spindle mounting axis, means for swinging said spindle mounting means from a work operating position, with said spindle mounting axis normal to said one arm, to a loading and unloading position with said axis substantially parallel to said one arm, a spindle installed in said spindle mounting means, means for positioning and securing work on said spindle for operation thereon, said means including a cone adjustably positionable along said spindle, a cylinder mounted on the free end of said first arm, in alignment with said spindle, when said spindle mounting means occupies its work operating position, a piston in said cylinder having a piston rod directed toward said spindle on a common axis therewith, an oppositely facing cone carried by said piston rod, and means for driving said piston toward said spindle to clamp work between said cones, and for withdrawing said piston away from said spindle to release such work for removal from said spindle, and means for retaining work on said spindle in condition for removal, following such withdrawal of said piston, said means including a spindle extension, slidably carried by said spindle, and spring means under compression between said spindle and said extension, and normally urging said extension to its extended position in the absence of a counter-restraining force, but adapted to give way in response to clamping movement of said piston.

11. A work holder assembly for supporting work to be operated on, comprising a yoke having substantially parallel spaced arms, a spindle mounting means pivotally supported at the end of one of said arms, said spindle mounting means including spindle supporting bearings, means for swinging said spindle mounting means from a work operating position, with the axis of said bearings normal to said one arm, to a loading and unloading position with said axis substantially parallel to said one arm, a spindle rotatably installed in said bearings for rotation therein, means for positioning and securing work such as a flanged roller or the like on said spindle for operation thereon, said means including a cone adjustably positionable along said spindle, a cylinder mounted on the free end of the other of said arms, in alignment with said spindle, when said spindle mounting means occupies its work operating position, a two-way piston in said cylinder having a piston rod directed toward said spindle on a common axis therewith an oppositely facing cone carried by said piston rod, and means for driving said piston toward said spindle to clamp work between said cones, and for withdrawing said piston away from said spindle to release such work for removal from said spindle, means for retaining work on said spindle in condition for removal, following such withdrawal of said piston, said means including a spindle extension, slidably carried by said spindle, and spring means under compression between said spindle and said extension, and normally urging said extension to its extended position in the absence of a counter-restraining force, but adapted to give way in response to clamping movement of said piston, means for rotatably driving work when clamped between said cones, and means for rotatably adjusting said yoke, said means including a supporting structure, a stub shaft extending symmetrically from said yoke through said supporting structure and journalled therein, and a motor drive carried by said supporting structure and having drive connection to said stub shaft.

12. A work holder assembly for supporting work to be operated on, comprising a yoke having substantially parallel spaced arms connected together at corresponding ends by a cross plate, one of said arms terminating at its free end in a mounting for a cylinder normal thereto, the other of said arms terminating in a fork having spaced parallel prongs, a spindle mounting means adapted to movably fit between said prongs, and including means for pivotally supporting the same on a pivot axis through the free ends of said prongs, said spindle mounting means carrying spindle supporting bearings on an axis normal to said yoke arms when said spindle mounting means is in the plane of said fork, a crank lever connected at one end to said spindle mounting means at the pivoting end thereof, means coupled to said crank lever and adapted, upon actuation in one direction, to swing said spindle mounting means from its position between said prongs to a position substantially normal to the plane of said fork, a spindle rotatably installed in said bearings for rotation therein, means for positioning and securing, work such as a flanged roller or the like, on said spindle for operation thereon, said means including a cone adjustably positionable along said spindle and facing outwardly, a cylinder mounted on the free end of said first arm, in alignment with said spindle, when said spindle occupies a position normal to said yoke arms, a two-way piston in said cylinder having a piston rod directed toward said spindle on a common axis therewith,
an oppositely facing cone carried by said piston rod, and
means for driving said piston toward said spindle to clamp work between said cones, and for withdrawing said piston away from said spindle to release such work for removal from the spindle,
means for retaining work on said spindle in condition for removal, following such withdrawal of said piston, said means including
a spindle extension, slidably carried by said spindle, and
spring means under compression between said spindle and said extension, and normally urging said extension to its extended position in the absence of a counter-restraining force, but adapted to give way in response to clamping movement of said piston,
means for rotatably driving work when clamped between said cones, said means including
a gear on said spindle within said housing,
a motor mounted on said housing, and carrying a drive pinion coupled to said gear,
means for rotatably adjusting said yoke, said means including
a supporting structure,
a stub shaft extending from said cross plate through said supporting structure and journalled therein,
a gear on said stub shaft between said cross plate and said supporting structure,
a motor drive carried by said supporting structure and having a pinion in mesh with said gear,
and means for counteracting the weight of said yoke and associated structure.

13. A work holder assembly for supporting work to be operated on, comprising
a yoke having substantially parallel spaced arms connected together at corresponding ends by a cross plate,
one of said arms terminating at its free end in a mounting for a cylinder normal thereto,
the other of said arms terminating in a fork having spaced parallel prongs,
a spindle mounting means adapted to movably fit between said prongs, and including means pivotally supporting the same on a pivot axis through the free ends of said prongs,
said spindle mounting means comprising a housing having spaced walls carrying spindle supporting bearings on an axis normal to said walls,
a crank lever connected at one end to said spindle mounting means at the pivoting end thereof,
a two-way piston coupled to said crank lever and adapted, upon actuation in one direction, to swing said spindle mounting means from its position between said prongs to a position substantially normal to the plane of said fork,
a spindle rotatably installed in said bearings for rotation therein,
means for positioning and securing work, such as a flanged roller or the like, on said spindle for operation thereon, said means including
a cone adjustably positionable along said spindle and facing outwardly therefrom,
a cylinder mounted on the free end of said first arm, in alignment with said spindle, when said spindle occupies a position normal to said yoke arms,
a two-way piston in said cylinder, having a piston rod directed toward said spindle on a common axis therewith,
an oppositely facing cone carried by said piston rod, and
means for driving said piston toward said spindle to clamp work between said cones, and for withdrawing said piston away from said spindle to release such work for removal from said spindle,
means for retaining work on said spindle in condition for removal, following such withdrawal of said piston, said means including
a spindle extension, slidably carried by said spindle, and
spring means under compression between said spindle and said extension, and normally urging said extension to its extended position in the absence of a counter restraining force, but adapted to give way in response to clamping movement of said piston,
and means for rotatably driving work when clamped between said cones, said means including
a gear on said spindle within said housing,
a motor mounted on said housing, and carrying a drive pinion coupled to said gear,
means for rotatably adjusting said yoke, said means including
a supporting structure,
a stub shaft extending from said cross plate through said supporting structure and journalled therein,
a gear on said stub-shaft betwen said cross plate and said supporting structure,
a motor drive carried by said supporting structure and having a pinion in mesh with said gear,
means for counteracting the weight of said yoke and associated structure, said means including
a bracket on said supporting structure, above the said yoke adjusting gear and extending to the front of said gear,
rollers carried by said bracket in contact with the the front face of said gear,
bracket means mounted on said supporting structure behind the lower portion of said yoke adjusting gear, and
rollers carried by said bracket means in contact with the rear face of said gear,
and means for locating said spindle, when in its loading position, on the axis of said stub shaft, regardless of the rotatable adjustment of said yoke.

References Cited by the Examiner
UNITED STATES PATENTS

| | | | |
|---|---|---|---|
| 537,013 | 4/1895 | Burton et al. | 219—159 X |
| 2,800,288 | 7/1957 | Bandy | 242—68.4 X |
| 2,914,316 | 11/1959 | Austin et al. | 219—159 X |
| 2,938,997 | 5/1960 | Anderson | 219—124 |
| 3,024,349 | 3/1962 | Henrichsen et al. | 219—76 X |
| 3,182,177 | 5/1965 | Anderson | 219—125 |

JOSEPH V. TRUHE, *Primary Examiner.*